United States Patent [19]
Kawanami et al.

[11] Patent Number: 5,910,871
[45] Date of Patent: Jun. 8, 1999

[54] MAGNETIC HEAD HAVING TRACK WIDTH SPECIFIED BY GROOVES FORMED WITH PROJECTION ION BEAM

[75] Inventors: Yoshimi Kawanami, Kokubunji; Hisashi Takano, Kodaira; Kaoru Umemura, Musashino; Yuichi Madokoro; Satoshi Tomimatsu, both of Kokubunji, all of Japan

[73] Assignee: Hitachi, Ltd., Tokyo, Japan

[21] Appl. No.: 08/837,218

[22] Filed: Apr. 22, 1997

[30] Foreign Application Priority Data

Apr. 25, 1996 [JP] Japan .................................. 8-104908

[51] Int. Cl.$^6$ ........................... G11B 5/31; G11B 5/127
[52] U.S. Cl. ................................ 360/122; 360/126
[58] Field of Search ................................ 360/119, 122, 360/126, 125; 29/603.07, 603.15, 603.16, 603.18

[56] References Cited

U.S. PATENT DOCUMENTS

| | | | |
|---|---|---|---|
| 5,406,434 | 4/1995 | Amin et al. | 360/126 |
| 5,452,166 | 9/1995 | Aylwin et al. | 360/126 |
| 5,479,310 | 12/1995 | Atsuhi et al. | 360/126 |

FOREIGN PATENT DOCUMENTS

| | | |
|---|---|---|
| 452 846 | 10/1991 | European Pat. Off. . |
| 61-34708 | 2/1986 | Japan . |
| 3-296907 | 12/1991 | Japan . |
| 5-266429 | 10/1993 | Japan . |
| 6-150278 | 5/1994 | Japan . |

*Primary Examiner*—David L. Ometz
*Attorney, Agent, or Firm*—Fay, Sharpe, Beall, Fagan, Minnich & McKee

[57] ABSTRACT

The track width of a magnetic head is specified by the interval between a pair of grooves in the slider surface that are formed by a projection ion beam. Specifically, the grooves are processed by projecting a mask having the pattern of the pair of grooves with a projection ion beam with reduction to a magnification of 1/10, for example. Although the peripheral strain of the pattern thus formed is large and the current distortion is not uniform when the projection ion beam batch irradiation area is limited, the increase in depth of the grooves formed at the periphery of the grooves does not affect the track narrowing process at the center portion of the projection ion beam since the strain thereof is negligibly small. As a result, a narrow track width is processed with high precision.

6 Claims, 8 Drawing Sheets

MAGNETIC HEAD HAVING TRACK WIDTH SPECIFIED BY GROOVES FORMED WITH PROJECTION ION BEAM

BACKGROUND OF THE INVENTION

The present invention relates to a magnetic head used for magnetic recording, a manufacturing method thereof, and a manufacturing apparatus thereof.

Japanese Patent Application Laid-Open 3-296907 and European Patent Application Publication Number 0 452 846 A2 corresponding thereto are known conventionally as a method of miniaturizing the track width (track narrowing) of a magnetic head so as to enhance the density of magnetic recording. In this conventional example, a focused ion beam having a submicron beam diameter is irradiated to the sliding surface of a magnetic head, and a pair of grooves are formed by sputtering, and the track width of the magnetic head is controlled by these grooves. This method is direct processing, so that the process is simple and excellent in miniaturization and controllability.

However, in the aforementioned conventional method, a problem arises that it is necessary to limit the current of the focused ion beam due to microfabrication and the throughput is low. Namely, to apply this method to a commercial production line, the throughput is insufficient by at least one digit.

SUMMARY OF THE INVENTION

An object of the present invention is to provide a low-cost magnetic head with a narrow track width, a manufacturing method thereof, and a manufacturing apparatus thereof. The above object is accomplished by processing two grooves arranged almost symmetrically on a part of the sliding surface of the magnetic head with a medium in a batch by an ion beam projecting a mask with reduction.

In the grooving process of narrowing the track of a magnetic head, the side portions of the grooves for deciding the track width require high precision. However, the shape of the peripheral portions of the grooves is of little concern. Therefore, the focused ion beam device is modified, and a device for generating an ion beam for projecting a mask having the aforementioned groove pattern with reduction is produced, and the track narrowing process is performed for the magnetic head by irradiating this projection ion beam. By use of this projection ion beam, the center portion of the beam can process with high precision and the whole ion beam current is increased by one digit or more compared with a focused ion beam realizing the same precision.

A projection ion beam generally has a lower current density than that of a focused ion beam, though it is known that the projection ion beam can irradiate a pattern in a wide area at a high resolution in a batch. We have found the design requirements for an apparatus for generating a projection ion beam having a higher edge resolution and a higher beam current than those of a focused ion beam by limiting the batch irradiation area of this projection ion beam to a size of several microns. However, in this projection ion beam, the peripheral strain of the pattern is large and the current distortion is not uniform, so that when the projection ion beam is used for processing, the peripheral portion is dug excessively. This characteristic seems to be unsuitable at a glance. However, we have found that when the projection ion beam is applied to the track narrowing process of a magnetic head, the characteristic is advantageous.

Namely, to form a pair of grooves with a size of several microns so as to narrow the track of a magnetic head, the portion of the sides of each groove for deciding the track width requires high precision of the order of 0.1 micron. The strain in the center portion of the aforementioned projection ion beam is negligibly small such as about 10 nm in this respect, so that the projection ion beam satisfies the necessary condition. On the other hand, the peripheral portion of each groove has an object of reducing the leak of the magnetic field from the magnetic poles, so that it is desirable to dig the grooves deeply. The aforementioned projection ion beam satisfies this condition naturally. The distortion of the peripheral shape of each groove is small. However, to control the processing shape of the magnetic poles precisely, it is desirable to deform the pattern shape with a mask projected by ions in the opposite direction of the distortion.

In this case, our projection ion beam device has been designed by means of modifying the dimensions of each portion of the conventional focused ion beam processing device substantially.

According to the present invention, a magnetic head corresponding to a minute track width can be provided at a practical cost, so that it is made possible to enhance the memory capacity and decrease the cost of a magnetic disk device loading it.

The embodiments of the present invention will be explained in detail hereunder with reference to the accompanying drawings.

DETAILED DESCRIPTION OF THE PREFERRED EMBODIMENTS

Figure 1:
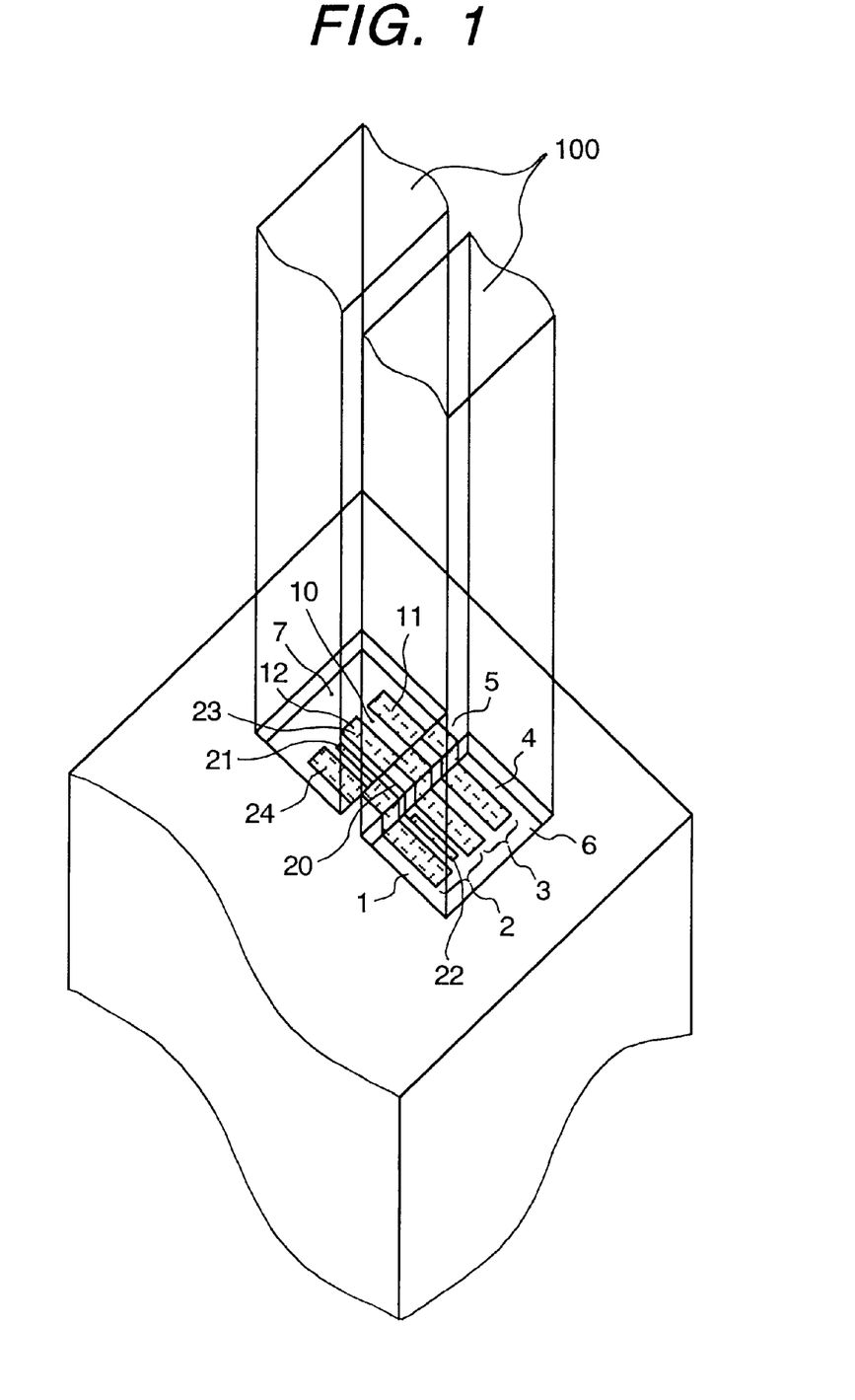
FIG. 1 is a perspective view of the portion of magnetic poles of the magnetic head of the present invention.

FIG. 1 is a perspective view of a read-write separative thin-film magnetic head during sputtering by irradiation of a projection ion beam which is observed from the sliding surface side. This magnetic head is produced by laminating a read head 2, a write head 3, and an alumina protective layer 4 sequentially on an alumina-titaniumcarbide compound slider base 1, cutting off them, and grinding the section thereof. This section is a sliding surface. The write head 1 comprises two Permalloy magnetic poles opposite to each other via an alumina gap layer. A coil winding around the magnetic poles 11 and 12 cannot be seen because it is installed inside. The read head 2 is produced by holding a magnetoresistive sensor 20 connected to copper electrodes 21 and 22 between Permalloy magnetic shield layers 23 and 24 via an alumina insulating layer. The lower magnetic pole 12 serves as the upper magnetic shield layer 23. The track width of the write head 3 before processing by a projection ion beam is 10 $\mu$m and that of the read head 2 is 3 $\mu$m.

In the magnetic head shown in FIG. 1, two rectangular grooves 6 and 7 with a size of 10 $\mu$m square and a depth of 2 $\mu$m are formed on the basis of the center of the read head 2 by sputtering by irradiation of a projection ion beam 100. By doing this, the track widths of both write head and read head are controlled to 2 $\mu$m by a convex 5. The ion species of the projection ion beam 100 used for processing is Ga and the blur of the edge of the processing pattern is 0.5 $\mu$m when the acceleration voltage is set to 30 KV and the beam current is set to 15 nA. The time required for grooving shown in FIG. 1 is about 30 seconds. As compared with a case of processing by a Ga focused ion beam with a beam diameter of 0.1 $\mu$m and a beam current of 1 nA, a processing speed of 15 times and a processing resolution of 2 times are obtained, and the difference in the sputtering coefficient for each material is reduced, and more flat processing is realized.

By use of the processing method of the present invention shown in FIG. 1, the track width of the read-write separative thin-film magnetic head can be narrowed at a high throughput and the centers of the read head and write head can be aligned precisely. Since the edge of the narrowed head is sharp, the leaked magnetic field can be reduced. Needless to say, by changing the aperture shape of a mask to be used for generating a projection ion beam, the track widths of the read head and write head can be changed. In FIG. 1, an example that both of the magnetic poles of the write head and the magnetic shield of the read head are processed is shown. However, the track width can be narrowed by processing of only the magnetic poles. Furthermore, needless to say, by changing the aperture shape of the mask, the magnetic poles can be trimmed perpendicularly to the track width. The alumina-titaniumcarbide compound used for the slider base of the head used in this embodiment is a non-conductive material, so that a viewpoint arises that a sample is charged up during processing by an ion beam and a groove cannot be formed precisely. However, no obstacles are caused to the practical processing. The reason seems to be that the ion beam is satisfactorily symmetrical and furthermore the Permalloy magnetic poles discharge electricity. To execute processing with higher precision in the embodiment shown in FIG. 1, it is desirable to take a countermeasure such as neutralizing the electrostatic charge by electron irradiation or discharging electricity by attaching an Au deposited layer beforehand.

Figure 2:
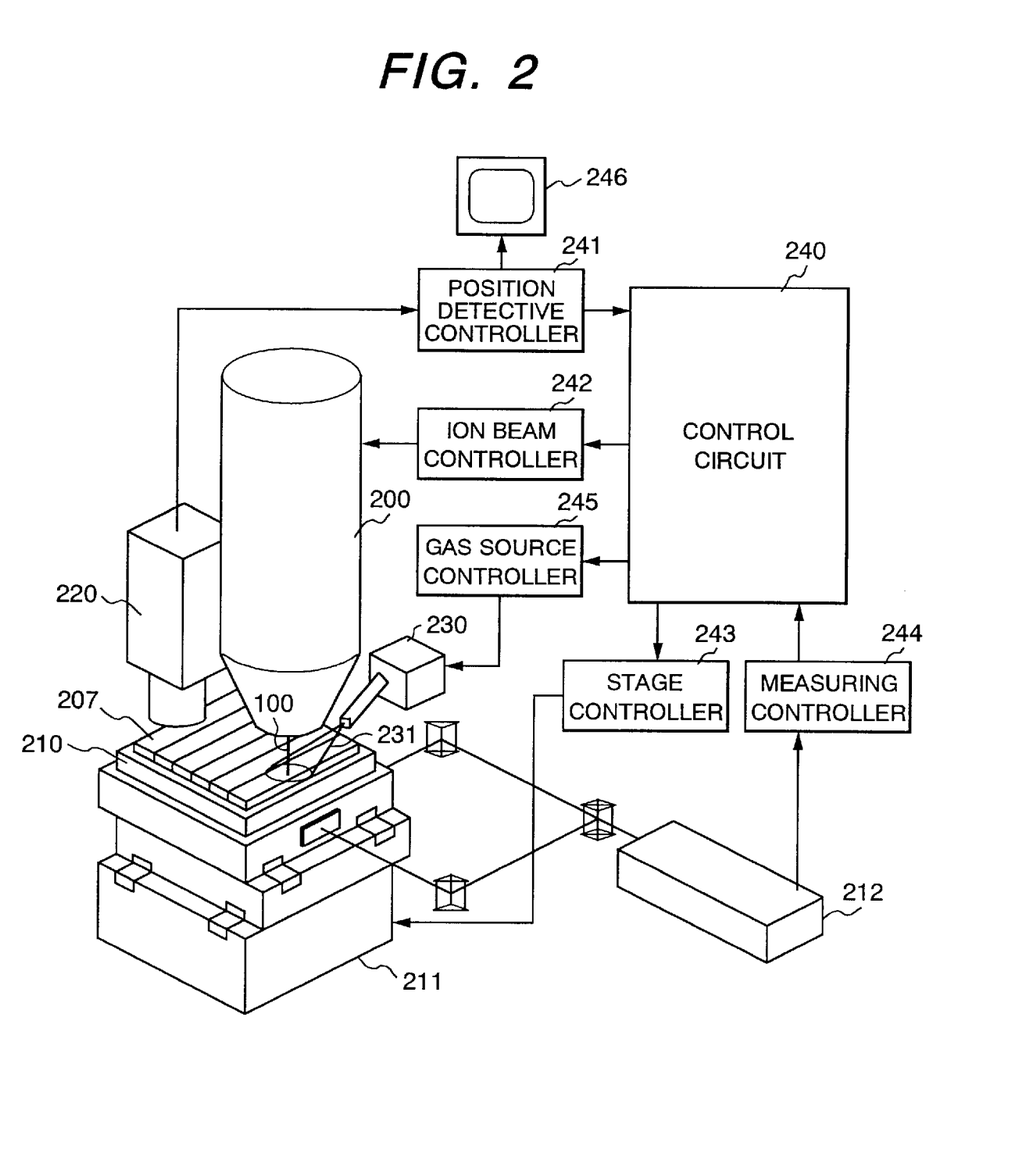
FIG. 2 is a schematic view of the magnetic head processing device of the present invention.

Next, the magnetic head processing device of the present invention used in FIG. 1 will be described. FIG. 2 is a schematic view showing the whole constitution of the magnetic head processing device of the present invention used for processing the magnetic head shown in FIG. 1. The essential components of this device are a projection ion beam optical system 200, a sample holder 210, a sample stage 211, a laser-interferometer dimensional measurement system 212, a laser microscope camera 220, and a gas source 230 and most of them are arranged inside a high vacuum vessel not shown in the drawing. A circuit for controlling them comprises a position detective controller 241, an ion beam controller 242, a stage controller 243, a measuring controller 244, a gas source controller 245, and a control circuit 240 for controlling all of them. Magnetic heads which are samples are connected in the array state and they are bundled and fixed to the sample holder 210 with electro wax. Next, the track narrowing procedure for a magnetic head will be explained. Firstly, the center position of every read head on the magnetic head array is measured with the accuracy of 0.05 $\mu$m beforehand. For this purpose, the control circuit 240 gives approximate position data of the magnetic head to the stage controller 243 beforehand, moves the sample stage 211, reads the sample image by the laser microscope camera 220, and sends it to the position detective controller 241. The position detective controller 241 reads the misalignment of the center position of the read head from the sample image and sends it to the control circuit 240. The control circuit 240 adds this misalignment, the stage position coordinate measured by the laser-interferometer dimensional measurement system 212, the predetermined center position of the read head, and the offset of the processing pattern center and stores the sum in the internal memory allocated for each magnetic head. As mentioned above, the control circuit 240 moves the sample stage 211 on the basis of the stage coordinate of the center of every measured read head, places an optional magnetic head right under the projection ion beam optical system 200, irradiates a projection ion beam to the sample, and processes it. In this case, the control circuit 240 gives the information of misalignment between the center of the projection ion beam and the center of each magnetic head to the ion beam controller 242 and corrects the position for irradiating the projection ion beam.

Figure 3:
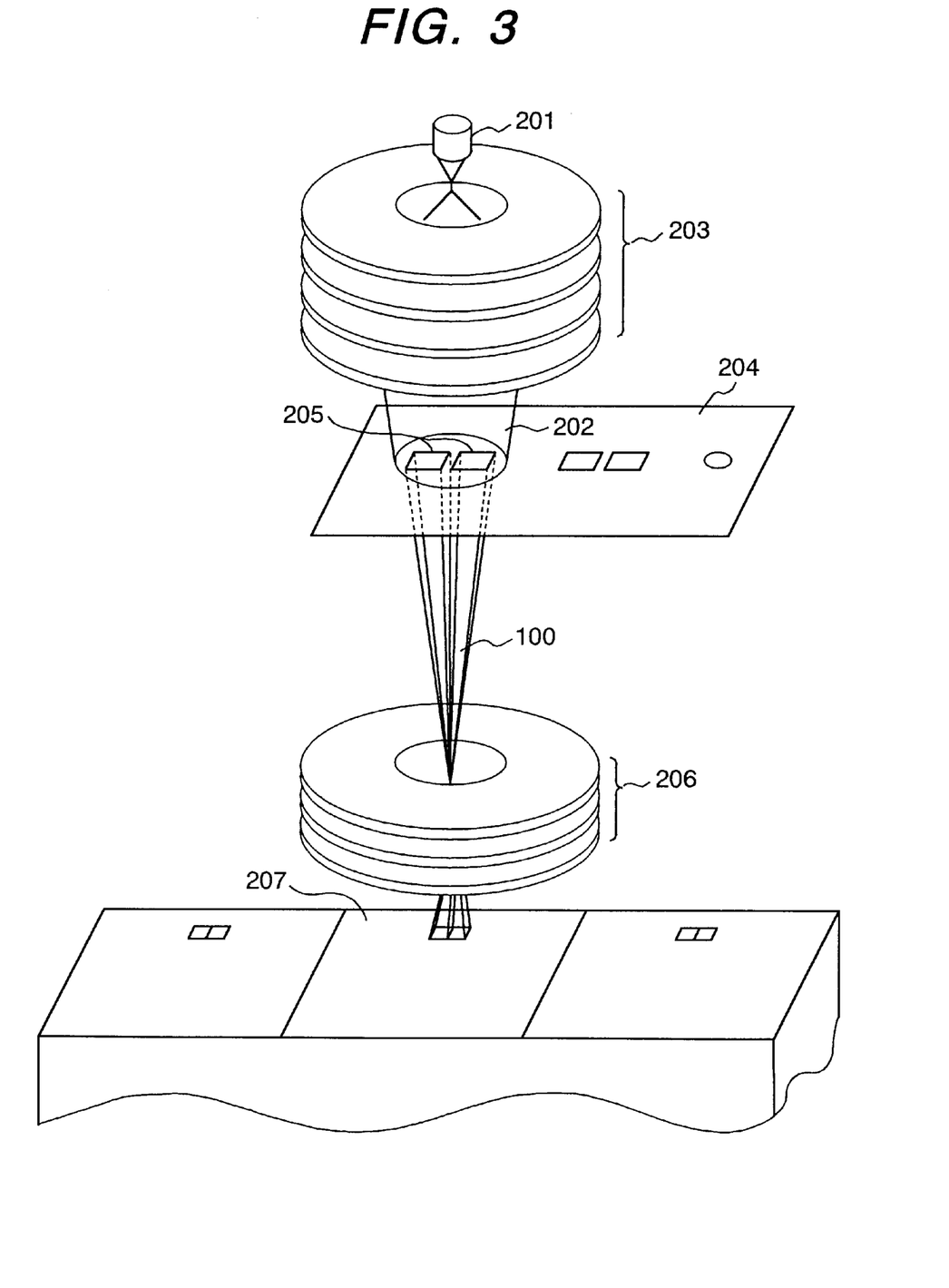
FIG. 3 is a schematic view of the projection ion beam optical system of the magnetic head processing device of the present invention.

A characteristic of the present invention is that high throughput processing can be performed by the projection ion beam optical system 200. The internal constitution thereof is shown in FIG. 3. An ion beam 202 emitted from a Ga liquid-metal ion source 201 is focused by an illuminating lens system 203, that is, an electrostatic lens (a compound lens of an acceleration lens and an Einzel lens) comprising 4 axially symmetric electrodes and irradiated to a mask 204. The illuminating lens system 203 is adjusted so as to accelerate the ion beam 202 to an acceleration voltage of 30 KV and focus it to the center of a projecting lens 206. An ion beam 100 of the ion beam 202 which transmits an aperture 205 of the mask 204 is irradiated onto a sample by the projecting lens 206, that is, an electrostatic lens (an Einzel lens) comprising 3 axially symmetric electrodes. The projecting lens 206 is adjusted so as to project the pattern of the mask 204 onto a sample 207 with reduction at a magnification of $\frac{1}{10}$. An electrostatic deflector not shown in the drawing is installed under the projecting lens 206 and the irradiation position of the ion beam 100 on the sample 207 can be moved within a range of 50 $\mu$m. A blanking deflector not shown in the drawing is installed on the projecting lens 206 and the irradiation of the projection ion beam 100 onto the sample 207 is switched to ON or OFF. The beam current of the projection ion beam 100 used for processing is 15 nA and the blur of the edge of the processing pattern is 0.05 $\mu$m. The processing position setting accuracy is 0.05 $\mu$m. The time required for grooving shown in FIG. 1 is about 30 seconds. When chlorine gas is blown from the gas source 230 when the projection ion beam is irradiated onto the magnetic head, the magnetic poles and magnetic shield are processed faster by two times and the processing time is reduced to about 15 seconds.

As mentioned above, according to the embodiment shown in FIGS. 2 and 3, the processing of narrowing the track width of the magnetic heads can be performed at a high throughput by precise positioning. In this embodiment, the center position of every magnetic head is read one by one. However, if the arrangement accuracy of each magnetic head in the magnetic head array is sufficiently high, it is possible only to read the center positions of at least two magnetic heads. Reading of the positions of at least two position detection marks provided on the magnetic head array beforehand can be substituted for reading of the positions of the very magnetic heads. Furthermore, in this embodiment, the positions of the magnetic heads are read using a laser beam. However, if damage due to electrostatic charge is avoided, the object can be also accomplished by reading the positions of the magnetic heads using an electron beam or ion beam. As such an ion beam, a focused ion beam which is generated by changing the opening of the mask 204 of the projection ion beam optical system 200 of the present invention to a circular aperture and resetting the intensity of the lens system can also be used.

In this embodiment, the magnetic poles of the magnetic head are processed by irradiating a projection ion beam from the sliding surface of the magnetic head. However, they can be processed by irradiating a projection ion beam perpendicularly to the lamination surface of the magnetic poles in the preceding stage of magnetic head production (the status that magnetic poles are laminated on a wafer-shaped slider base). In this case, it is necessary to increase the processing volume of the portion of magnetic poles in consideration of the margin of each magnetic head for cutting. Therefore, although the throughput may be reduced slightly, the same effect as that of this embodiment can be obtained.

Figure 4:
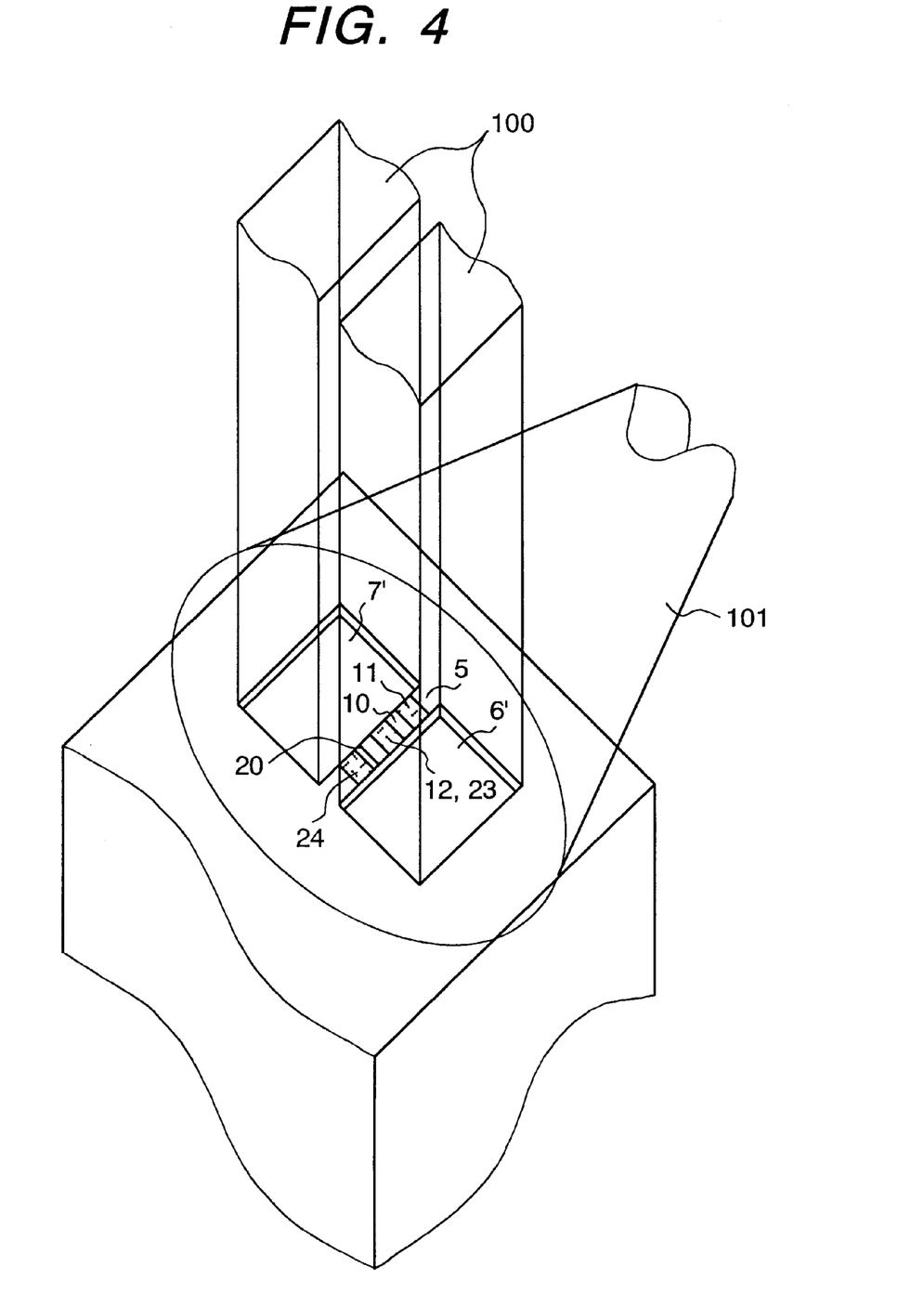
FIG. 4 is a perspective view of the portion of magnetic poles of the magnetic head of the present invention.

FIG. 4 is a perspective view of the read-write separative thin-film magnetic head sputtered by irradiation of a projection ion beam as shown in FIG. 1 which is further processed and observed from the sliding surface side. The constitution of the projection ion beam device used for this processing may be the same as that shown in FIGS. 2 and 3. In this processing, several kinds of deposition inducible gases 101 are showered in turn with irradiating the projection ion beam 100 to the magnetic heads.

A characteristic of this embodiment is that in the same projection ion beam device, the magnetic shield for preventing a leaked magnetic field is formed in succession to the processing of narrowing the track width of the magnetic heads. After grooving, the projection ion beam 100 is irradiated by blowing CO gas 101 and an insulating C film is formed in grooves 6' and 7'. Thereafter, the gas 101 is switched to Cu (hfac) TMVS (copper-hexafluoroacetylacetonate-trimethylvinylsilane) and a good conductive Cu film is formed. The respective processing times are about 2 seconds and about 5 seconds. The C film prevents the magnetoresistive sensor 20 from short-circuiting via the magnetic poles 11 and 12. When the sample is heated up to about 100° C. by an infrared lamp during forming of the Cu film, the conductivity of the film can be made similar to the value of bulk Cu. When a write head is operated by high frequency waves of 20 MHz or more, the leaked magnetic field from other than the convex portion of the head can be shielded by 90% or more by this good conductive Cu film.

As mentioned above, according to the embodiment shown in FIG. 4, a magnetic head having a narrow track width and a small leaked magnetic field in the high frequency area can be produced in the same device, so that the process can be simplified and the cost can be decreased.

Figure 5:
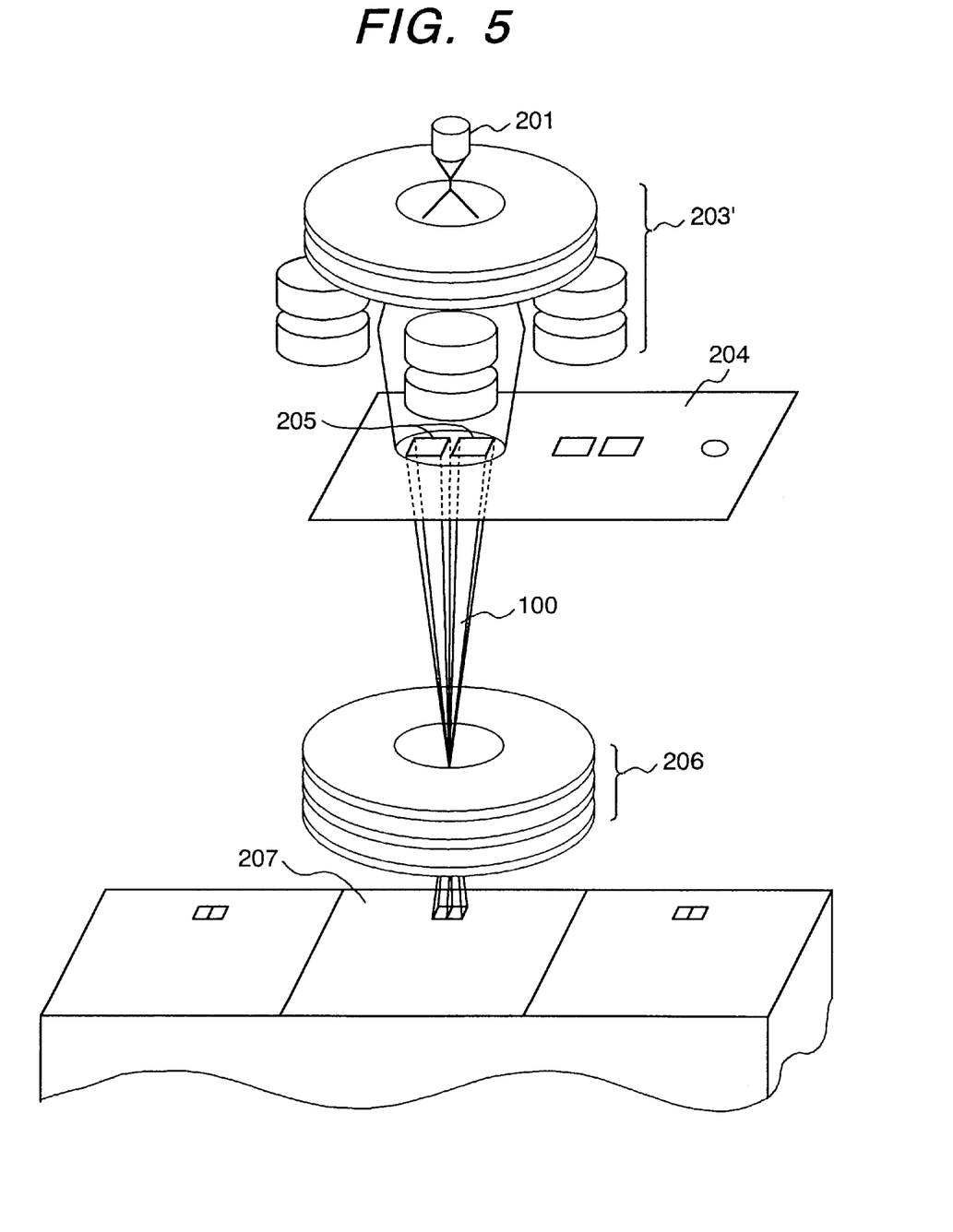
FIG. 5 is a schematic view of the projection ion beam optical system of the magnetic head processing device of the present invention.

FIG. 5 is a schematic view showing the constitution of the main unit of the magnetic head processing device of this embodiment. The greater part of this device is the same as the device of Embodiment 2, except that an illuminating lens system 203' is not axially symmetric. The illuminating lens system 203' comprises an electrostatic lens (an acceleration lens) having two axially symmetric electrodes and two-stages of quadrapole lenses. By use of this two-stage quadrapole lens, the shape of the ion beam on the mask 204 can be changed from a circle to an ellipse under the condition that an ion beam 202' is focused to the center of the projecting lens 206 in the same way as with Embodiment 2.

A characteristic of the embodiment shown in FIG. 5 is that by use of the non-axially symmetric illuminating lens system 203', an ion beam can be irradiated according to the non-axially symmetric aperture pattern 205 on the mask 204. As compared with the device of Embodiment 1, an ion current about two times of that of the same processing pattern can be irradiated to the sample 207.

As mentioned above, according to this embodiment, in the processing of narrowing the track width of a magnetic head, a high throughput can be obtained using the ion beam efficiently.

Figure 6A:
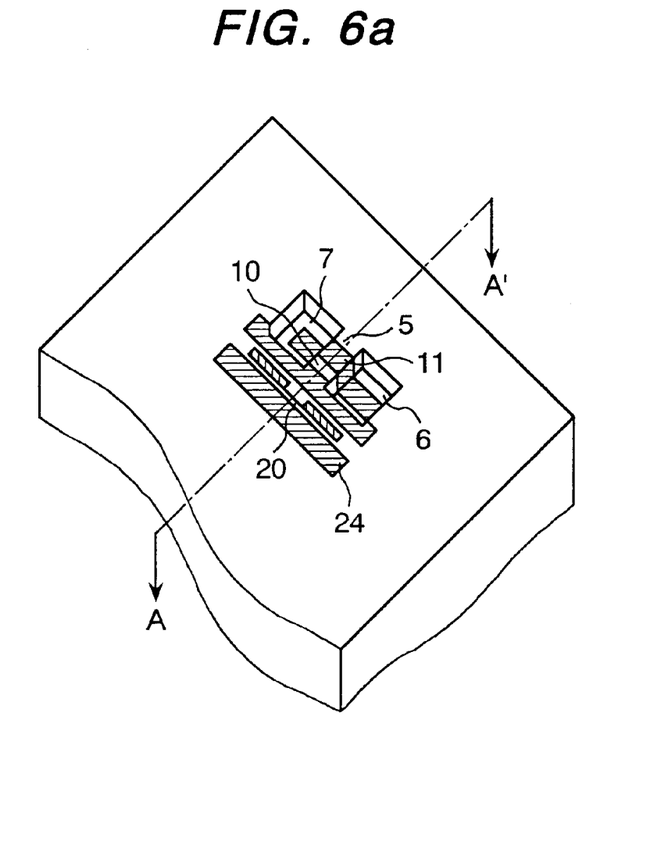
FIGS. 6a and 6b are a perspective view and a longitudinal cross sectional view of the magnetic head of the present invention, respectively, after processing by a projection ion beam.

FIG. 6(a) shows a perspective view of the magnetic head of the present invention after processing grooves by a projection ion beam. In this embodiment, only a part of the upper pole of the write head 11 and the lower pole of the write head 12 is processed and the read head is not processed. By doing this, damage of the magnetoresistive sensor 20 caused by ion irradiation is avoided. The grooves 6 and 7 are about 1.0 micron in depth.

Figure 6B:
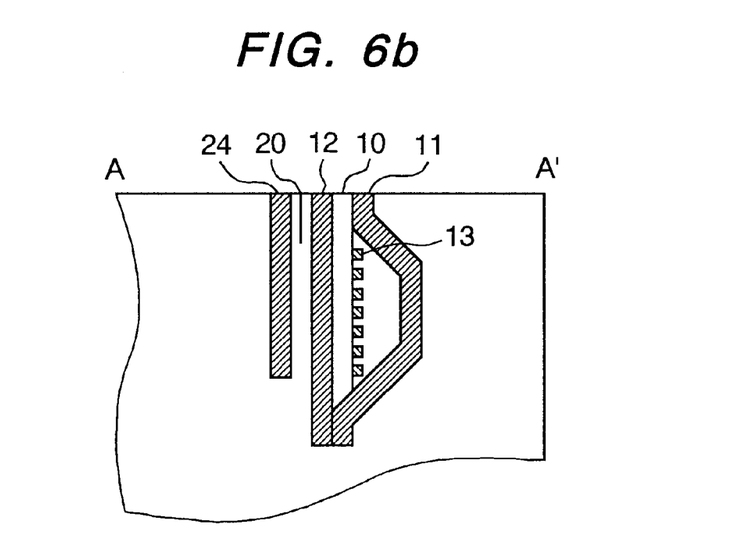

The longitudinal section A–A' of the magnetic head shown in FIG. 6(a) is shown in FIG. 6(b). The structure of the section A–A' is the same as that before grooving. The magnetic field generated by the current flowing through a coil 13 passes through inside the magnetic poles 11 and 12 and leaks out at the end of a gap layer 10. Information is recorded on a medium not shown in the drawing by this leaked magnetic field. On the concave portions of the sliding surface 6 and 7 formed by grooving, the recording magnetic poles 11 and 12 retract, so that the magnetic field is concentrated between the recording magnetic poles 11 and 12 of the concave portion of the sliding surface 5. Namely, a narrow track width can be realized.

Figure 7A:
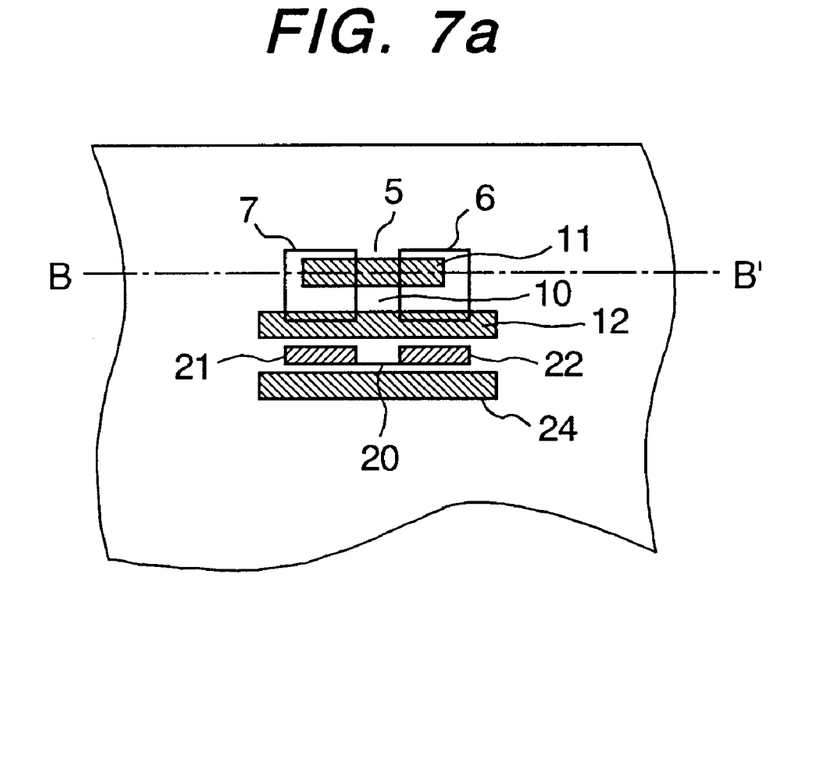
FIGS. 7a and 7b are a top view and a transverse cross sectional view of the sliding surface side of the magnetic head of the present invention, respectively, after processing by a projection ion beam.
Figure 7B:
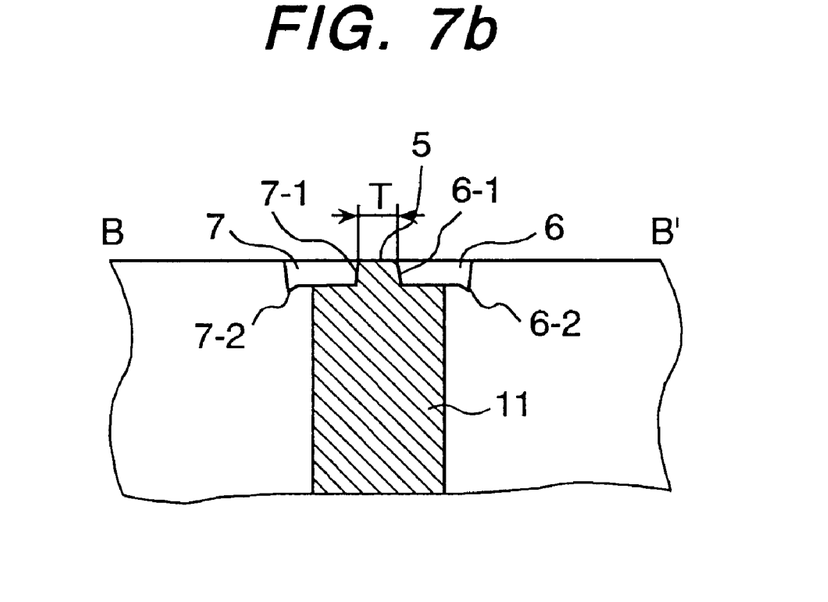

FIG. 7(a) shows a front view of the sliding surface side of the magnetic head of the present invention after processing grooves by a projection ion beam. The dimensions of each groove are 3 microns in length and 2 microns in width and the interval between the two grooves is 1 micron. FIG. 7(b) shows the transverse section B–B' of this magnetic head. The edge of each groove processed by a projection ion beam is blurred only about 10 nm and side walls 6-1 and 7-1 of the convex portion of the magnetic pole 5 are naturally angled about 80° by sputtering, though the precision is very high. Therefore, in this magnetic head, the track width T can be reduced to 1.0 micron with the accuracy of 0.1 micron or less. The current of the projection ion beam used for processing is 50 nA and the current density is close to 400 mA/cm$^2$. The processing time is about 3.5 seconds. Inward strains between 0.1 micron and 0.2 micron are generated in the periphery of the processing pattern, so that the current density of the beam increases toward outsides 6-2 and 7-2 of the grooves 6 and 7 and the grooves can be dug deeply by about 0.2 micron at the outsides 6-2 and 7-2. However, the magnetic characteristics of this magnetic head are changed little by this depth distribution of the grooves.

Figure 8A:
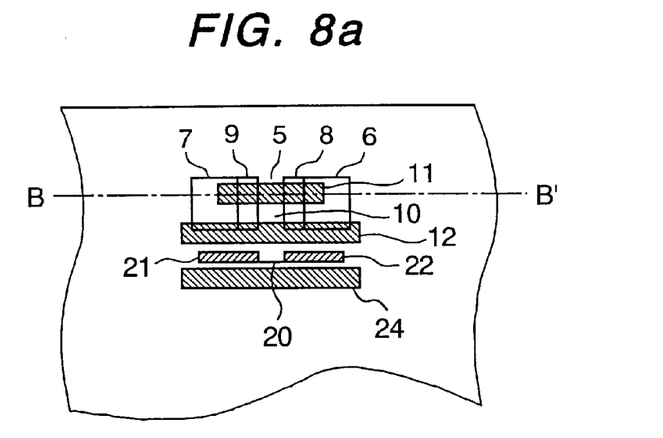
FIGS. 8a, 8b and 8c are a top view and transverse cross sectional views, respectively, of the sliding surface side of the magnetic head after processing by a focused ion beam.
Figure 8B:
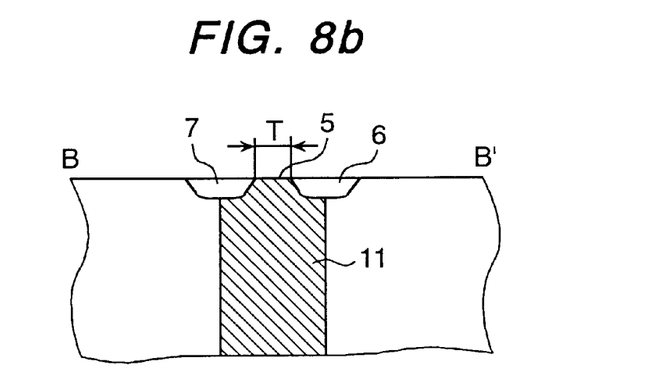
Figure 8C:
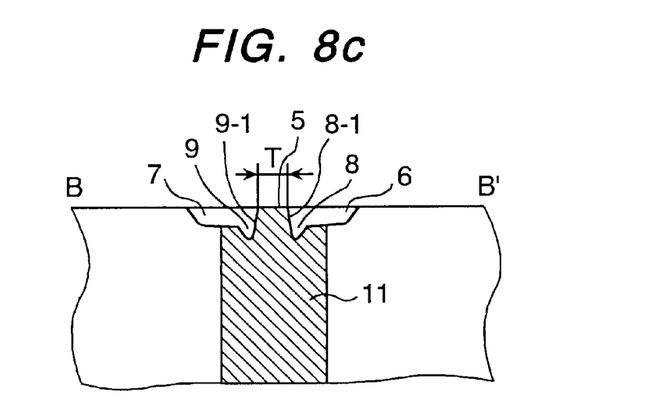

Next, the magnetic head of the present invention will be compared with a magnetic head which is subjected to the same processing by a focused ion beam. The front view of the sliding surface side of the magnetic head processed by a focused ion beam is shown in FIG. 8(a). Firstly, the grooves 6 and 7 are processed by a broad beam with a large current (a current of 10 nA and a beam diameter of 1 micron). The section B–B' in this case is shown in FIG. 8(b). The track width T is not clear due to a blur of about 1 micron of the edge of the processing area. Since the concentration of magnetic field to the concave portion of the magnetic pole 5 is not sufficient actually, the effective track width becomes larger than 1 micron. Additionally, therefore, grooves 8 and 9 shown in FIG. 8(c) are processed on both sides of the convex portion of the magnetic pole 5 by a narrower beam (a current of 1 nA and a beam diameter of 0.1 micron). By doing this, a magnetic pole with a clear track width T as shown in FIG. 8(c) is obtained. The magnetic pole 5 with a narrow track width can be formed even by a focused ion beam like this. However, since an ion beam with a small current is used for processing, the throughput is low. Even if the magnetic pole 5 with a narrow track width is formed, deep grooves 8-1 and 9-1 are generated on both sides thereof. Therefore, as compared with the aforementioned processing by a projection ion beam, the concentration of magnetic field is worse and the intensity of recording magnetic field is lower. On the other hand, in the magnetic head of the present invention shown in FIG. 7, the leaked magnetic field in the transverse direction can be reduced and the track width can be narrowed.

In the magnetic head of the present invention, to prevent the magnetoresistive sensor 20 from electric destruction, a protective film of diamond-like carbon can be formed overall the sliding surface immediately after groove formation. However, when the read head portion is not grooved like this embodiment, it is possible to form a protective film beforehand and then process grooves.

The entire disclosure of Japanese Patent Application No. 8-104908 filed on Apr. 25, 1996 including specification, claims, drawings and summary are incorporated herein by reference in its entirety.

What is claimed is:

1. A magnetic head for performing writing and reading operations of magnetically recorded information to a magnetic recording medium, wherein at least one groove for specifying the track width of a magnetic pole of said head is provided in a part of a sliding surface of said magnetic head, and wherein said at least one groove has a substantially uniform depth and a depth of said at least one groove at the edge opposite to the pole is deeper than said substantially uniform depth, and said at least one groove is processed by irradiating with an ion beam which projects a mask with reduction.

2. A magnetic head according to claim 1, wherein said at least one groove comprises a pair of grooves and the track width of the magnetic pole of said head is specified by the interval of said pair of grooves provided on said sliding surface.

3. A magnetic head according to claim 1, wherein said at least one groove is formed by irradiating at least one of etching gas and deposition inducible gas at the same time with irradiation of said ion beam.

4. A magnetic head according to claim 1, wherein at least a part of said at least one groove is filled with a nonmagnetic material and said nonmagnetic material is formed by irradiating deposition inducible gas at the same time with irradiation of said ion beam.

5. A magnetic head according to claim 1, wherein said magnetic head is a read-write separative thin-film magnetic head and said at least one groove is processed on the basis of a center position of the read head.

6. A magnetic head for performing writing and reading operations of magnetically recorded information to a magnetic recording medium, wherein a pair of grooves for specifying the track width of magnetic poles of said head are provided in a part of a sliding surface of said magnetic head with said medium, and wherein each of said pair of grooves has a substantially uniform depth and a depth of each of said pair of grooves at the edge opposite to the poles is deeper than said substantially uniform depth.

* * * * *